United States Patent [19]
Hayase et al.

[11] Patent Number: 6,085,155
[45] Date of Patent: Jul. 4, 2000

[54] LASER REMOTE COMMAND SYSTEM AND TARGETS THEREFOR

[75] Inventors: Shinichi Hayase; Fumio Ohtomo, both of Tokyo, Japan

[73] Assignee: Kabushiki Kaisha Topcon, Tokyo, Japan

[21] Appl. No.: 08/819,254

[22] Filed: Mar. 18, 1997

[30] Foreign Application Priority Data

Mar. 19, 1996 [JP] Japan .................................. 8-090063

[51] Int. Cl.[7] .................................................. G01B 11/26
[52] U.S. Cl. ............................................................ 702/40
[58] Field of Search .............................. 702/40; 356/399, 356/400, 139.1, 139.03, 141.1, 141.2; 342/5, 6

[56] References Cited

U.S. PATENT DOCUMENTS

| | | | |
|---|---|---|---|
| 5,612,781 | 3/1997 | Ohtomo et al. | 356/152.2 |
| 5,621,531 | 4/1997 | Van Andel et al. | 356/399 |
| 5,621,975 | 4/1997 | Rando | 33/227 |
| 5,680,208 | 10/1997 | Butler et al. | 356/250 |
| 5,684,490 | 11/1997 | Young et al. | 342/70 |

*Primary Examiner*—Tod R. Swann
*Assistant Examiner*—Matthew Smithers
*Attorney, Agent, or Firm*—Baker Botts L.L.P.

[57] ABSTRACT

The present invention relates to a laser irradiating device and a target device, and particularly to a laser irradiating device capable of performing remote control without using a radio remote controller. A plurality of reflective pattern members are prepared wherein combination reflective members respectively composed of reflective portions A for storing the direction of polarization and reflecting it, and polarizing-direction conversion reflective portions C for converting the direction of polarization and reflecting it are arranged. The combination reflective members of the individual reflective pattern members are respectively made different in arrangement from one another. Further, the reflective pattern member corresponding to a command to be transferred to the laser irradiating device reflects identification reflected light corresponding to the command onto the laser irradiating device, whereby the laser irradiating device can be remote-controlled.

11 Claims, 11 Drawing Sheets

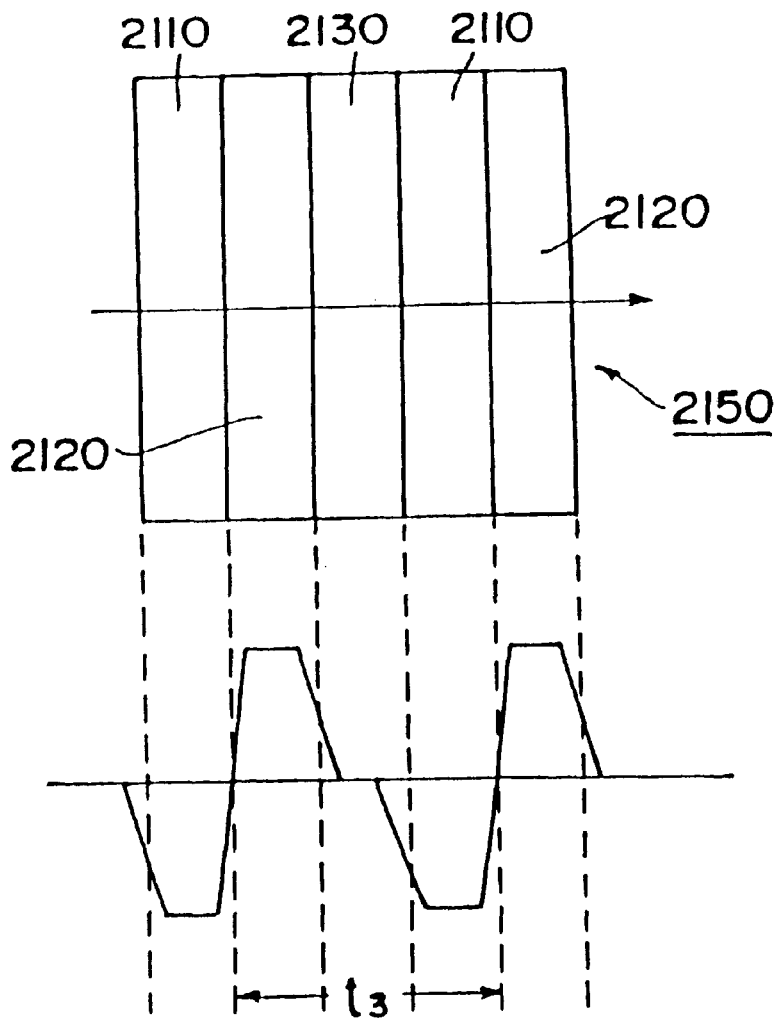

POLARIZING-DIRECTION
CONVERSION REFLECTIVE
PORTION C

REFLECTIVE
PORTION A

LASER REMOTE COMMAND SYSTEM AND TARGETS THEREFOR

BACKGROUND OF THE INVENTION

1. Field of the Invention

The present invention relates to a laser irradiating device and a target device, and particularly to a laser irradiating device capable of performing remote control without using a radio remote controller, and a target device.

2. Description of the Related Art

Ink-jetting using a visible light-laser irradiating device has heretofore been mainstream in place of the conventional ink-jetting using a ink pot upon interior working for buildings or the like. The visible light-laser irradiating device has a laser-beam emitting means thereinside and is constructed so as to be able to scan a laser beam, using a rotatable drive unit.

As shown in FIG. 13, a laser irradiating device comprises a laser irradiating device body 10000 and a target plate 20000. Reflectors are formed on the left and right sides of the target plate 20000 and are constructed so as to reflect a laser beam emitted from the laser irradiating device body 10000.

The laser irradiating device body 10000 applies the laser beam to the target plate 20000 under the rotation of the laser beam to thereby perform ink-jetting on the locus of the visible-light laser. However, since the rotating irradiation makes it hard to visually recognize the ink-jetting using the laser beam. Therefore, visibility has been improved by executing reciprocating scan at the position of interposition of the target plate 20000 between the reflectors when the laser irradiating device body 10000 receives light reflected from the target plate 20000.

FIG. 14 shows a laser rotation irradiating device using a radio remote controller 30000 in place of the target plate 20000. The laser rotation irradiating device can perform reciprocating scan at a required position by the radio remote controller 30000. The present laser rotation irradiating device can perform a variety of scannings as compared with the laser irradiating device body 10000 using the target plate 20000. The laser rotation irradiating device can select various operations such as [a scan operation, a stop operation, a hold operation, etc.] by remote control.

However, although the prior art using the above-described target plate 20000 can perform the reciprocating scan, it was necessary to use a control panel attached to the laser irradiating device body 10000 upon execution of other operations.

On the other hand, the prior art using the radio remote controller 30000 has a problem in that although the prior art can perform a variety of operations as compared with the art using the target 20000, there is a possibility that the prior art will incur radio interference, thereby making it unable to simultaneously use a plurality of devices.

Further, a problem arises that in order to place several hundred meters under radio remote control, the laser irradiating device body 10000 and the like are forced to consume power than required, thereby increasing the consumption of a battery and carrying the radio remote controllers 30000 with a plurality of workers will result in uneconomy.

Moreover, a serious problem arises in that under the remote control using the radio remote controller 30000, a procedure for performing reciprocating scan at a predetermined position becomes irksome and the radio remote controller 30000 that conforms to the law of an exporting country, must be prepared.

SUMMARY OF THE INVENTION

According to one aspect of the present invention, there is provided a target device for reflecting a laser beam produced from a laser irradiating device, comprising:

a plurality of reflective pattern members wherein combination reflective members respectively composed of reflective portions A for storing the direction of polarization and reflecting it, and polarizing-direction conversion reflective portions C for converting the direction of polarization and reflecting it are arranged, the combination reflective members of the individual reflective pattern members being respectively made different in arrangement from one another, the reflective pattern member corresponding to a command to be transferred to the laser irradiating device reflecting identification reflected light corresponding to the command onto the laser irradiating device, whereby the laser irradiating device can be remote-controlled.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will now be described with reference to the accompanying drawings wherein.

DETAILED DESCRIPTION OF THE INVENTION

Preferred embodiments of the present invention will hereinafter be described in detail with reference to the accompanying drawings.

Principle

The principle of the present invention will be described.

Figure 3:
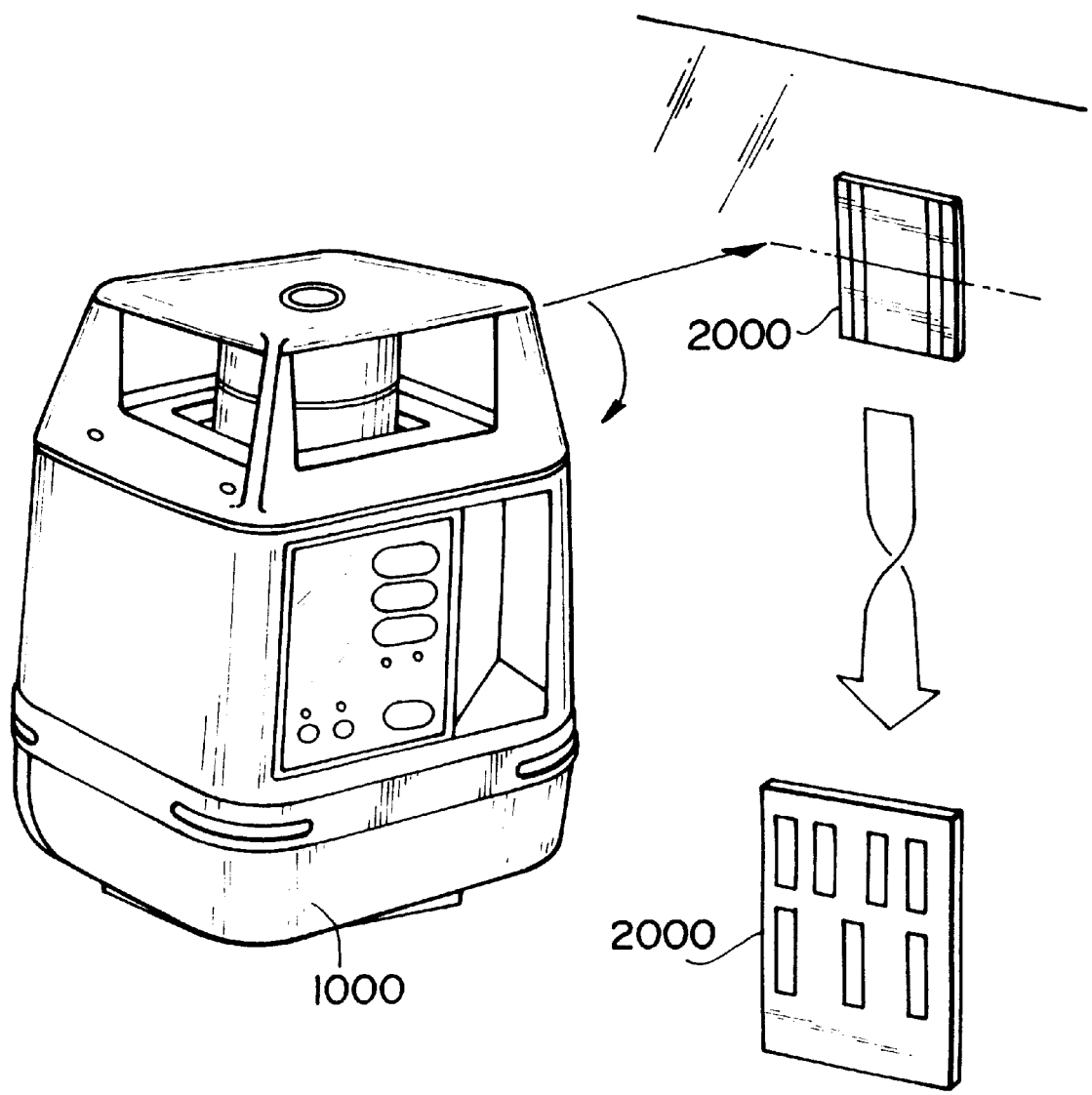
FIG. 3 is a perspective view for describing the present embodiment.

A body 1000 (hereinafter called "laser irradiating device body") of a laser irradiating device according to the present invention is remotely controlled as shown in FIG. 3. Namely, after the detection of a target 2000, a user provides a reflective pattern member corresponding to an [operation command] to be transferred to the laser irradiating device body 1000 from a plurality of prepared reflective pattern members and scans a reflective pattern corresponding to the [operation command] and reflects identification reflected light, whereby the laser irradiating device body 1000 is remotely controlled.

In the present invention, the laser irradiating device body 1000 is controlled according to a combination of reflective patterns. Although one has heretofore been proposed which captures reflected light and changes remote operation on the laser irradiating device body 1000 side, one capable of intentionally realizing remote control from the target 2000 side has not yet proposed.

When the laser irradiating device body 1000 is horizontally disposed and activated, a laser beam is applied to a horizontal plane or a reference plane while being rotated. Further, when the target 2000 is shifted to an ink-feeding position and scanned with the laser beam, the laser irradiating device body 1000 receives light reflected from the target 2000 therein and performs reciprocating scanning at a position for holding the target 2000.

When one reflective pattern member on the target 2000 is scanned during the rotation or reciprocating operation of the laser irradiating device body 1000, the laser irradiating device body 1000 selects an operation corresponding to the pattern of a laser beam reflected from the reflective pattern member and performs its operation.

The resetting or release of its operation may be performed by taking off the target 2000. Alternatively, a release pattern may be prepared and used for its reset. Further, a basic reflective pattern member for causing the laser irradiating device body to perform reciprocating scanning is formed on a target surface of the target 2000.

A reflective pattern member and identification reflected light will be described below.

First Principle

Figure 4:
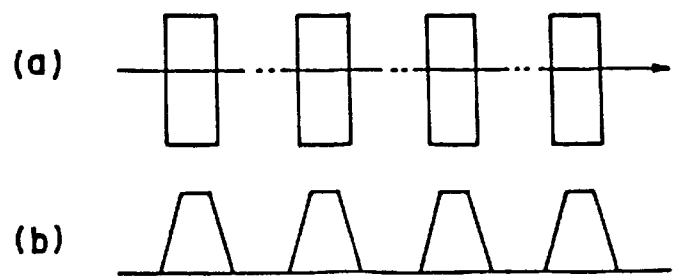
FIGS. 4(*a*) and 4(*b*) are views for explaining a first principle.

A reflective pattern member 2100 formed on the surface or back of a target 2000 employed in the first principle is constructed such that a plurality of retroreflective members 2110, 2110, . . . are transversely arranged as shown in FIG. 4(a).

Namely, the retroreflective members 2110 and irreflective members are alternately arranged in the horizontal direction to form the reflective pattern member 2100. The retroreflective members 2110, 2110, . . . correspond to reflective portions A and irreflective members interposed between the adjacent reflective portions A correspond to irreflective portions B, respectively.

The laser irradiating device body 1000 scans the target 2000 so as to measure the number of a plurality of retroreflective members 2110, 2110, . . . thereby making it possible to identify an [operation command].

Namely, now consider where a reflective pattern member 2100 in which the number of the retroreflective members 2110, 2100, . . . is four, is defined as for a [scan operation], a reflective pattern member 2100 in which the number of the retroreflective members 2110, 2100, . . . is six, is defined as for a [stop operation], and a reflective pattern member 2100 in which the number of the retroreflective members 2110, 2110, . . . is eight, is defined as for a [hold operation]. When a user desires to instruct the laser irradiating device body 1000 to execute the [stop operation], the laser irradiating device body 1000 may allow the target 2000 to display out or manifest the reflective pattern member 2100 in which the number of the retroreflective members 2110, 2110, . . . is six.

The laser irradiating device body 1000 can obtain such detected signals as shown in FIG. 4(b) corresponding to the identification reflected light through a light-receiving element. In the laser irradiating device body 1000, an calculate processing means measures the number of signals corresponding to the number of the retroreflective members 2110, 2110, . . . formed over the reflective pattern member 2100, which are shown in FIG. 4(b). When the calculate processing means recognizes through the identification reflected light that the number of the retroreflective members 2110, 2110, . . . is six, the calculate processing means causes the laser irradiating device body 1000 to execute the [stop operation].

According to the first principle as described above, the particular [operation command] can be transferred to the laser irradiating device body 1000 if the reflective pattern member 2100 corresponding to the command is prepared in plural form and the number of the retroreflective members 2110, 2110, . . . is changed for each reflective pattern member 2100.

Incidentally, the number of the reflective pattern members 2100 may be suitably set according to the number of commands.

Second Principle

Figure 5:
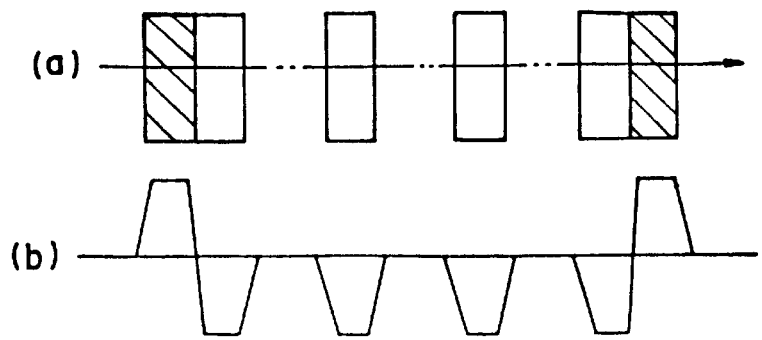
FIGS. 5(*a*) and 5(*b*) are views for explaining a second principle.

A reflective pattern member 2100 formed on the surface or back of the target 2000 employed in the first principle is configured such that a plurality of retroreflective members 2110, 2110, . . . are arranged in the transverse direction and λ/4 double refractive members 2120, 2120, . . . are provided at both ends of the individual retroreflective members 2110 as shown in FIG. 5(a).

The retroreflective members 2110, 2110, . . . correspond to reflective portions A and irreflective members interposed between the adjacent members A and A correspond to irreflective members B, respectively. Further, the λ/4 double refractive members 2120, 2120, . . . correspond to polarizing-direction conversion reflective portions C respectively.

Each of the λ/4 double refractive members 2120, 2120, . . . has the action of causing a phase difference of λ/2 between an incident light bundle or flux and a polarized flux of reflected light. If the laser irradiating device body 1000 utilizes this property, then it can identify light reflected by the retroreflective members 2110, 2110, . . . and light reflected by the λ/4 double refractive members 2120, 2120, . . . .

As shown in FIG. 5(b) by way of example, the light reflected from each of the λ/4 double refractive members 2120, 2120, . . . is detected as a positive signal and the light reflected from each of the retroreflective members 2110, 2110, . . . is detected as a negative signal.

Thus, if the number of the negative signals which are interposed between the positive signals obtained from the λ/4 double refractive members 2120, 2120, . . . is measured, then the number of the retroreflective members 2110, 2110, . . . can be recognized.

Similarly to the first principle, the particular [operation command] can be transferred to the laser irradiating device body 1000 if the reflective pattern member 2100 corresponding to the command is prepared in plural form and the number of the retroreflective members 2110, 2110, . . . is changed every reflective pattern members 2100.

Since other configurations and operations are similar to those employed in the first principle, their description will be omitted.

Third Principle

Figure 6:
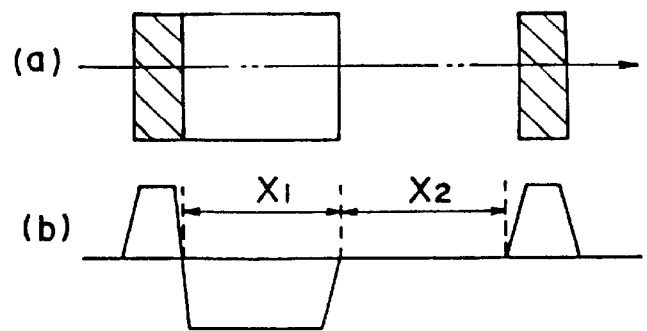
FIGS. 6(*a*) and 6(*b*) are views for explaining a third principle.

A reflective pattern member 2100 formed on the surface or back of the target 2000 employed in the third principle is configured such that a plurality of retroreflective members 2110 are formed and λ/4 double refractive members 2120, 2120, . . . are disposed at both ends thereof as shown in FIG. 6(*a*).

In the reflective pattern member 2100 interposed between the λ/4 double refractive members 2120 and 2120, a portion at which the retroreflective member 2110 is formed, corresponds to a reflective portion A, and a portion at which the retroreflective member 2110 is not formed, corresponds to an irreflective portion B, respectively. Further, the retroreflective member 2110 and the λ/4 double refractive member 2120 layered on the retroreflective member 2110 correspond to a polarizing-direction conversion reflective portion C.

In the second principle, the [operation command] has been identified according to the number of the retroreflective members 2110, 2110, . . . . In the third principle, however, the [operation command] is identified based on the ratio between the transverse length ($X_1$) of the portion (reflective portion A) with the retroreflective member 2110 formed thereon and the transverse length ($X_2$) of the portion (irreflective portion B) with no retroreflective member 2110 formed thereon.

If the scan speed and detecting time or encoder output of the laser irradiating device body 1000 are utilized, then the transverse length ($X_1$) of each portion (reflective portion A) with the retroreflective member 2110 formed thereon and the transverse length ($X_2$) of each portion (irreflective portion B) with no retroreflective member 2110 formed thereon can be easily computed owing to the reception of light reflected by the reflective portion A.

This computation will now be described by a specific example on the basis of FIG. 6(*b*).

Now consider where $R=X_1/X_2$.

A condition for $R \leq 0.75$ is defined as a [stop mode]. A condition for $R \geq 1.5$ is defined as a [hold mode]. A condition for $0.75 < R < 1.5$ is defined as a [track mode].

Three types of reflective pattern members 2100 that meet such R conditions, are prepared. If, for example, a reflective pattern member 2100 that satisfies the condition for $R \leq 0.75$, is provided, then the calculate processing means of the laser irradiating device body 1000 determines a length $X_1$ of a portion having a retroreflective member 2110 formed thereon and a length $X_2$ of a portion having no retroreflective member 2110 within an interval interposed between the λ/4 double refractive members 2120 and 2120 to compute R. As a result, the calculate processing means can identify the [stop mode] corresponding to the condition for $R \leq 0.75$.

Since other configurations and operation are similar to those employed in the first and second principles, their description will be omitted.

Fourth Principle

Figure 7:
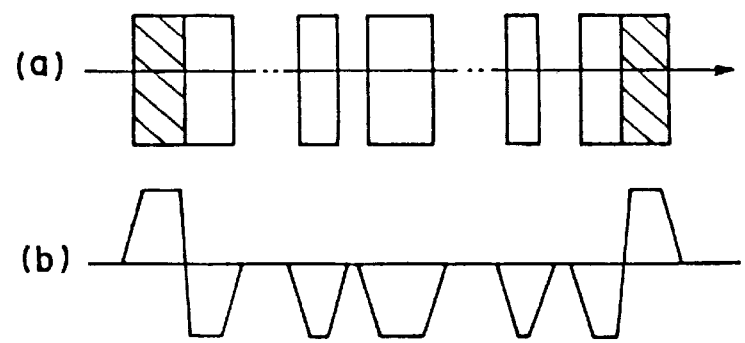
FIGS. 7(*a*) and 7(*b*) are views for explaining a fourth principle.

A reflective pattern member 2100 formed on the surface or back of a target 2000 employed in the fourth principle is configured such that a plurality of retroreflective members 2110, 2110, . . . are arranged in the transverse direction and λ/4 double refractive members 2120, 2120, are provided at both ends of the individual retroreflective members 2110 as shown in FIG. 7(*a*).

Each of the retroreflective members 2110, 2110, . . . corresponds to a reflective portion A, an irreflective member interposed between the adjacent reflective portions A corresponds to an irreflective portion B, and each of λ/4 double refractive members 2120, 2120, . . . corresponds to a polarizing-direction conversion reflective portion C.

In the second principle, the [operation command] has been identified by recognizing [the number of the retroreflective members 2110, 2110, . . . interposed between the λ/4 double refractive members 2120 and 2120]. According to the fourth principle, however, the [operation command] is identified by recognizing [a pattern of an array composed of the retroreflective members 2110, 2110, . . . ].

Namely, the fourth principle causes the laser irradiating device body 1000 to execute a desired operation when the transverse width and interval of each retroreflective member 2110 are suitably changed, and the array pattern is caused to correspond to the [operation command] to thereby identify a specific pattern.

When, for example, a pattern shown in FIG. 7(*a*) is defined as a [stop mode], the laser irradiating device body 1000 receives identification reflected light corresponding to the pattern. When a detected signal shown in FIG. 7(*b*) is obtained, the calculate processing means recognizes the [stop mode] so as to deactivate the laser irradiating device body 1000.

Further, the calculate processing means of the laser irradiating device body 1000 is provided with a pattern recognizing means for receiving reflected light corresponding to the pattern of the array formed of the retroreflective members 2110 and determining whether the array pattern coincides with a predetermined identification pattern.

Since other configurations and operations are similar to those employed in the first through third principles, their description will be omitted.

Fifth Principle

Figure 9A:
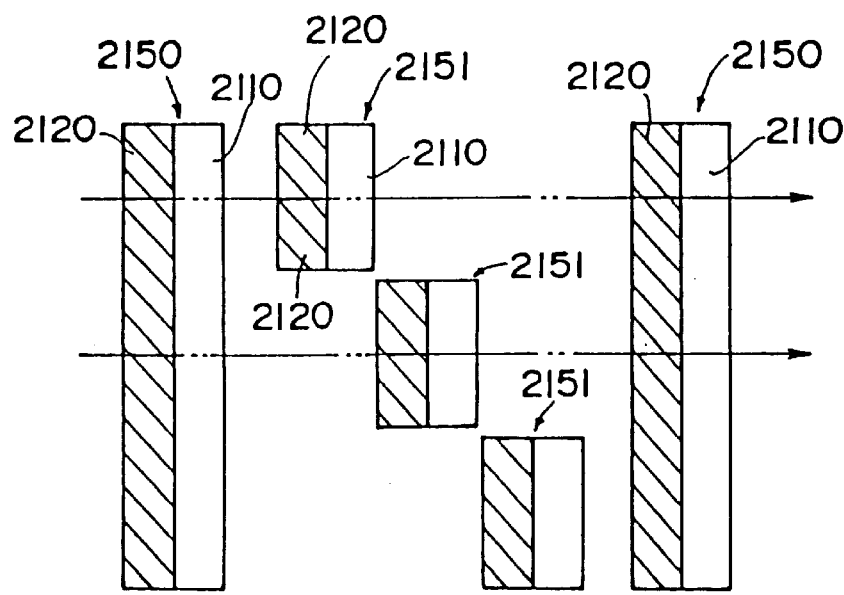
FIGS. 9(*a*), 9(*b*) and 9(*c*) are views for describing the fifth principle.
Figure 9B:
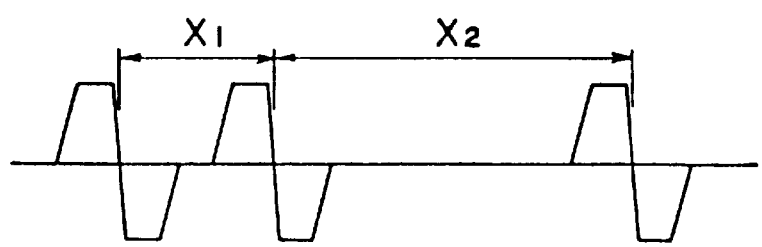
Figure 9C:
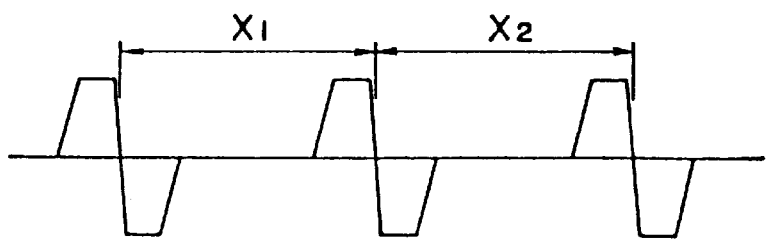

A reflective pattern member 2100 formed on the surface or back of a target 2000 employed in the fifth principle is configured such that a plurality of combination reflective members 2150, 2150, . . . composed of combinations of retroreflective members 2110 and λ/4 double refractive members 2120 are arranged in the transverse direction as shown in FIGS. 9(*a*), 9(*b*) and 9(*c*).

Each of the combination reflective members 2150 employed in the present embodiment is configured so that the λ/4 double refractive member 2120 is bonded onto a portion of the surface on the retroreflective member 2110. Accordingly, incident light is directly reflected by the retroreflective member 2110 in a region or portion, in which the retroreflective member 2110 is bared, within each combination reflective member 2150. Light incident on a region or portion covered by the λ/4 double refractive member 2120 is transmitted through the λ/4 double refractive member 2120 and reflected by the retroreflective member 2110. Thereafter, the reflected light penetrates the λ/4 double refractive member 2120 again so as to radiate out into the outside.

Since the fifth principle uses the combination reflective members 2150, 2150, . . . each composed of the retroreflective member 2110 and the λ/4 double refractive member 2120, high-accuracy detection can be performed.

The combination reflective member 2150 will now be described with reference to FIG. 8(*a*).

The combination reflective member 2150 is constructed by providing retroreflective members 2110 on a substrate 2130 and bonding λ/4 double refractive members 2120 to portions of the surfaces on the retroreflective members 2110.

Although the combination reflective member 2150 employed in the present embodiment is configured by superimposing the retroreflective members 2110 and the λ/4 double refractive members 2120 on the substrate 2130, the λ/4 double refractive members 2120 may be bonded directly to the retroreflective members 2110 exclusive of the substrate 2130.

Further, the combination reflective member 2150 may be also configured by singly providing a double refractive member composed of the retroreflective member 2110 and the λ/4 double refractive member 2120 superimposed thereon so as to fully cover the surface of the retroreflective member 2110 and making a combination of the double refractive member and the retroreflective member 2110 prepared in isolation.

When polarized light falls on the combination reflective member 2150, the direction of the polarized light varies between a region or portion in which the retroreflective member 2110 is bare and a region or portion in which the λ/4 double refractive member 2120 is covered. Namely, when circularly polarized light is incoming, then the direction of rotation will work in reverse. On the other hand, when linearly polarized light is incoming, then a difference in 90 degrees appears at both portions.

When the laser irradiating device body 1000 receives light reflected by the λ/4 double refractive member 2120, it can output a positive signal therefrom. On the other hand, when the laser irradiating device body 1000 receives light reflected by the retroreflective member 2110, it can output a negative signal therefrom.

Figure 8:
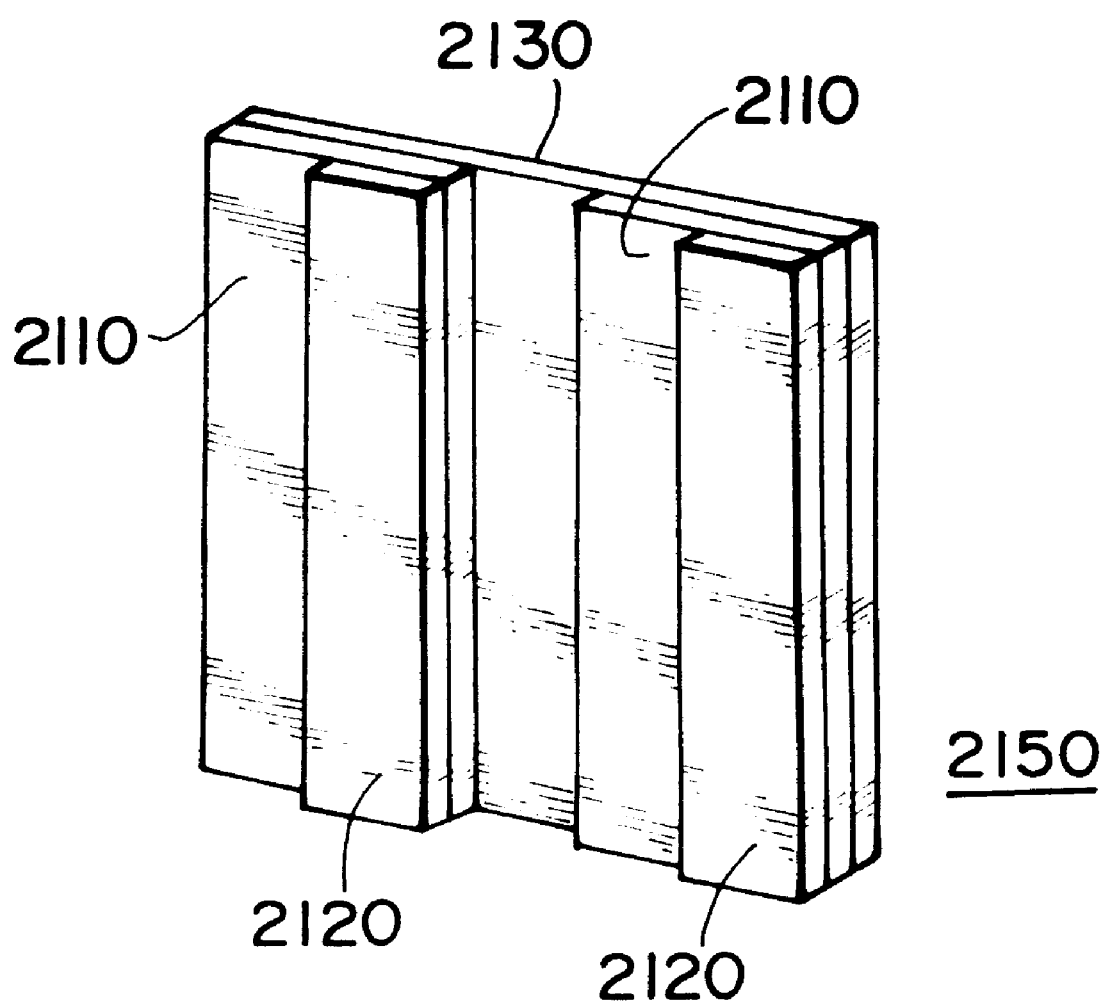
FIGS. 8(*a*), 8(*b*) and 8(*c*) are views for explaining a fifth principle.

FIGS. 8(*b*) and 8(*c*) show the state of reception of reflected light. A sharp rise or fall can be detected at the boundary between the portion in which the retroreflective member 2110 of the combination reflective member 2150 is bare and the portion in which the λ/4 double refractive member 2120 thereof is covered. Unsharp and fuzzy detection is made at positions other than the portion in which the retroreflective member 2110 is exposed and the portion in which the λ/4 double refractive member 2120 is covered.

In the fifth principle, the [operation command] is identified according to the position of each combination reflective member 2151 for identification, which is disposed within an interval interposed between the combination reflective members 2150 and 2150 disposed at both ends of the reflective pattern member 2100.

The fifth principle is similar to the third principle and features that the [operation command] has been identified according to the ratio between the transverse length ($X_1$) of a portion (reflective portion A) at which the retroreflective member 2110 is formed and the transverse length (X2) of a portion (irreflective portion B) at which no retroreflective member 2110 is formed. In the fifth principle, however, the [operation command] is identified according to the length ratio of a distance ($X_1$) between the combination reflective member 2150 on the left end side and the combination reflective member 2151 for identification to a distance ($X_2$) from the combination reflective member 2151 for identification to the combination reflective member 2150 on the right end side.

Figure 10:
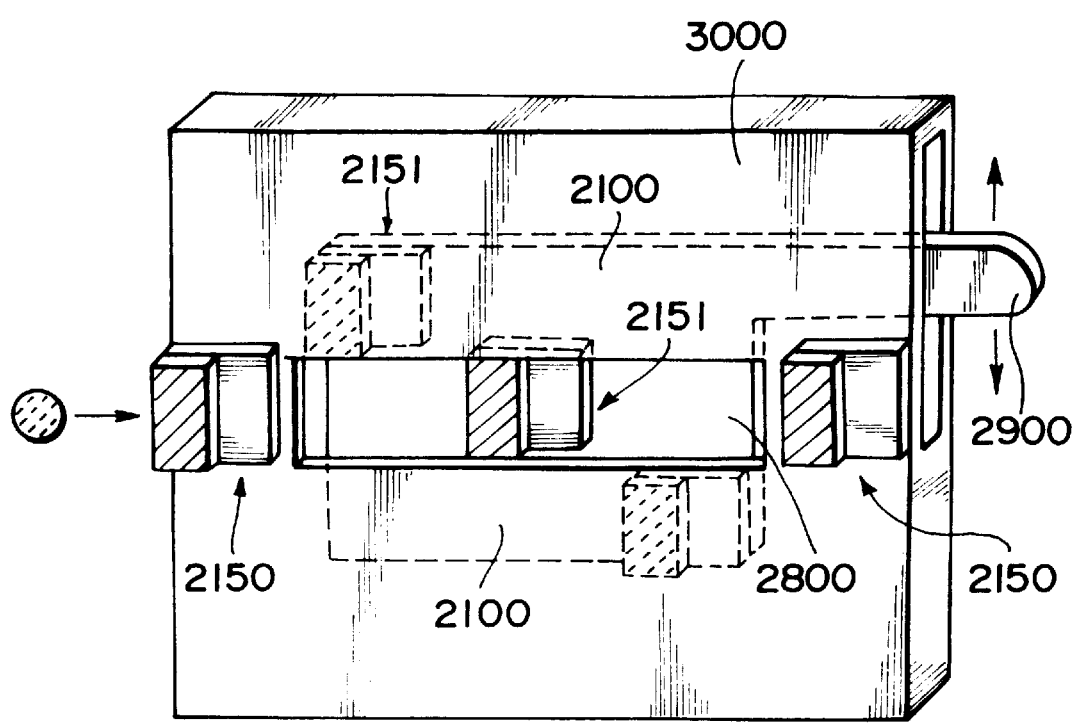
FIG. 10 is a view for describing a target.

FIG. 10 shows the target 3000 employed in the fifth principle. A slidable device capable of sliding the reflective pattern member 2100 corresponding to the [operation] for giving instructions to the laser irradiating device body 1000 in the vertical direction is provided so that the reflective pattern member 2100 is made bare through a window 2800. The reflective pattern member 2100 corresponding to a desired [operation command] can be manifested or bared by displacing a handle 2900 in the upward and downward directions.

Figure 11:
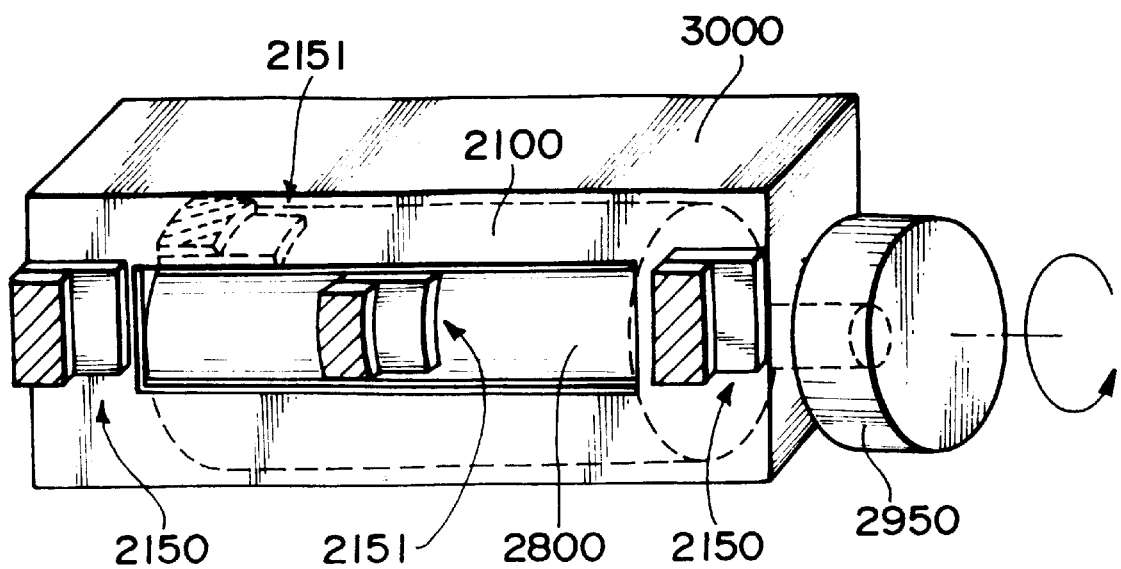
FIG. 11 is a view for describing the target shown in FIG. 10.

FIG. 11 illustrates the target 3000 employed in the fifth principle in the same manner as described above. A rotatable mechanism is provided to make bare a reflective pattern member 2100 corresponding to an [operation] for giving instructions to the laser irradiating device body 1000 through a window 2800. The reflective pattern member 2100 corresponding to a desired [operation command] can be peeped out through the window 2800 by rotating a control or knob 2950.

Since other configurations and operations are similar to those employed in the first through fourth principles, their description will be omitted.

Embodiment

A preferred embodiment of the present invention will be described with reference to the accompanying drawings.

An optical configuration and an electrical configuration of a rotatable irradiating device body 1 will be described. Incidentally, the rotatable irradiating device body 1 corresponds to a laser irradiating device body 1000.

Figure 1:
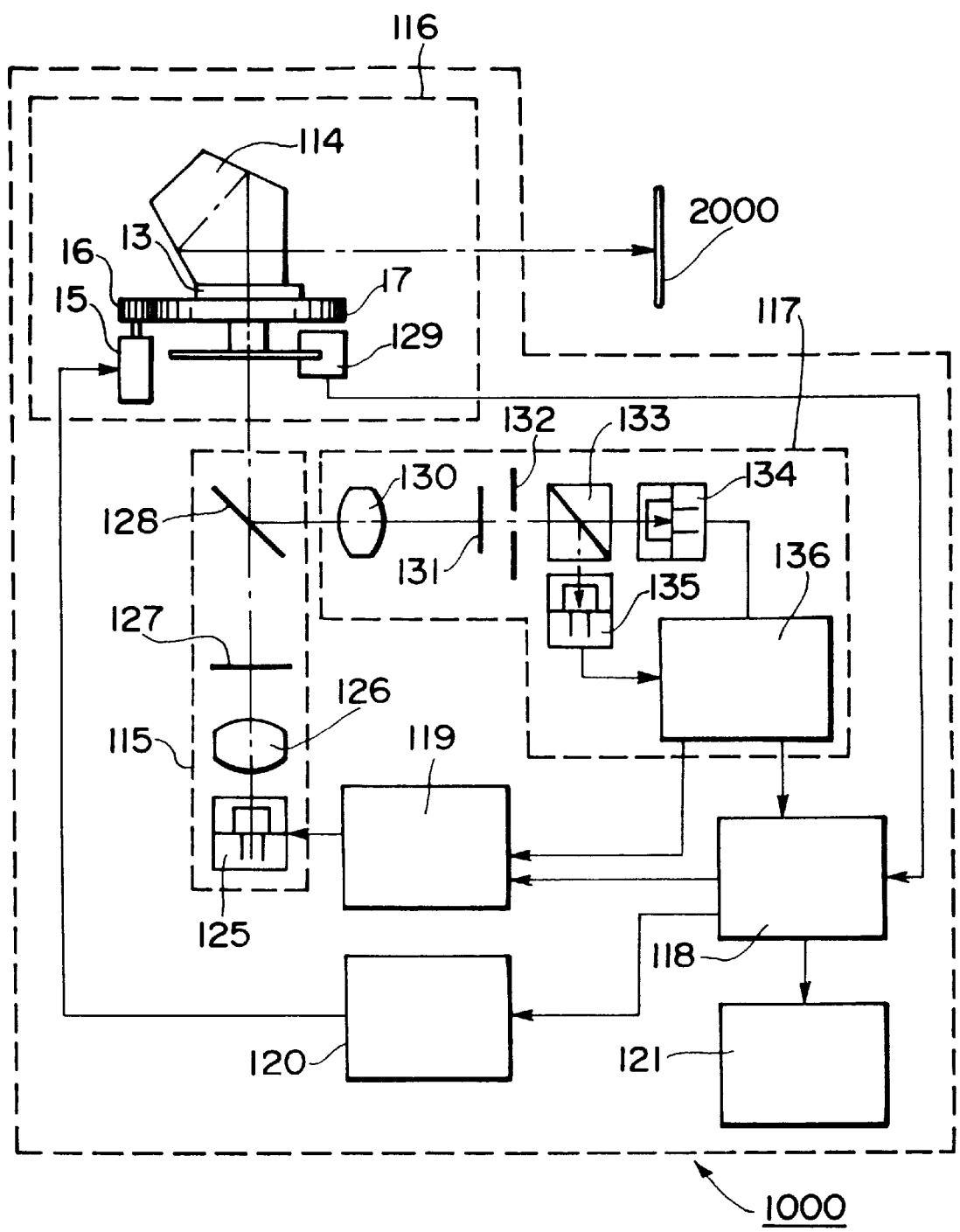
FIG. 1 is a view for describing the structure of an embodiment of the present invention.

As shown in FIG. 1, the rotatable irradiating device body 1 comprises a light-emitting unit 115, a rotatable unit 116, a reflected light detecting unit 117, a control unit (CPU) 118, a light-emitting device drive unit 119, a motor drive unit 120 and a display 121.

The control unit (CPU) 118 corresponds to an calculate processing means.

The light-emitting unit 115 will now be described.

A collimator lens 126, a first λ/4 double refractive member 127 and a perforated mirror 128 are successively disposed on an optical axis of a laser diode 125 for emitting a linearly polarized flux of irradiation light as seen from the laser diode 125 side. The linearly polarized flux of irradiation light emitted from the laser diode 125 is made parallel light by the collimator lens 126, which is converted into circularly polarized light by the first λ/4 double refractive member 127. A circularly polarized flux of irradiation light passes through the perforated mirror 128 so as to be emitted to the rotatable unit 116.

The rotatable unit 116 deflects the optical axis of the polarized flux of irradiation light incident from the light-emitting unit 115 by 90 degrees and performs emission scanning in this condition. A pentaprism 114 for deflecting the optical axis of the polarized flux of irradiation light incident from the light-emitting unit 115 by 90 degrees is provided on a rotatable support 13 rotated about the optical axis of the polarized flux of irradiation light. A state of rotation of the rotatable support 13 is detected by an encoder 129 and the signal detected by the encoder 129 is inputted to the control unit 118.

A polarized flux of reflected light from a target 2000 falls on the rotatable unit 116. The polarized flux of reflected light incident on the pentaprism 114 is deflected toward the perforated mirror 128, which allows the polarized flux of reflected light to fall on the reflected light detecting unit 117.

The reflected light detecting unit 117 will next be described.

A condenser lens 130, a second λ/4 double refractive member 131, a pinhole 132, a polarizing beam splitter 133, and a first photoelectric converter 134 are successively disposed on a reflecting optical axis of the perforated mirror 128 as seen from the perforated mirror 128 side. Further, a second photoelectric converter 135 is disposed on a reflecting optical axis of the polarizing beam splitter 133. Outputs produced from the first photoelectric converter 134 and the second photoelectric converter 135 are inputted to a reflected light detecting circuit 136.

The polarizing beam splitter 133 divides the polarized flux of reflected light incident on the reflected light detecting unit 117 and allows the divided light to fall on the first photoelectric converter 134 and the second photoelectric converter 135. However, the second λ/4 double refractive member 131 and the polarizing beam splitter 133 are disposed in such a manner that a light flux, which coincides in polarizing direction with a polarized flux of reflected light returned to the body after the polarized flux of reflected light emitted from the light-emitting unit 115 has been transmitted through the λ/4 double refractive member twice, falls on the first photoelectric converter 134 and a polarized flux of reflected light returned to the body in the same polarizing direction as the polarized flux of reflected light emitted from the light-emitting unit 115, falls on the second photoelectric converter 135.

A combination reflective member 2150 formed on the target 2000 will next be described.

The combination reflective member 2150 is constructed such that retroreflective members 2110 are provided on a substrate 2130 and λ/4 double refractive members 2120 are bonded to portions of the surfaces of the retroreflective members 2110 respectively.

Although the combination reflective member 2150 employed in the present embodiment is configured by superimposing the retroreflective members 2110 and the λ/4 double refractive members 2120 on the substrate 2130, the λ/4 double refractive members 2120 may be bonded directly to the retroreflective members 2110 exclusive of the substrate 2130.

Further, the combination reflective member 2150 may be configured by singly providing a double refractive member composed of the retroreflective member 2110 and the λ/4 double refractive member 2120 superimposed thereon so as to fully cover the surface of the retroreflective member 2110 and making a combination of the double refractive member and the retroreflective member 2110 prepared in isolation.

When polarized light falls on the combination reflective member 2150, the direction of the polarized light varies between a region or portion at which the retroreflective member 2110 is bare and a region or portion at which the λ/4 double refractive member 2120 is covered. Namely, if circularly polarized light is incoming, then the direction of rotation will work in reverse. If linearly polarized light is incoming, then a difference in 90 degrees appears at both portions.

Figure 12:
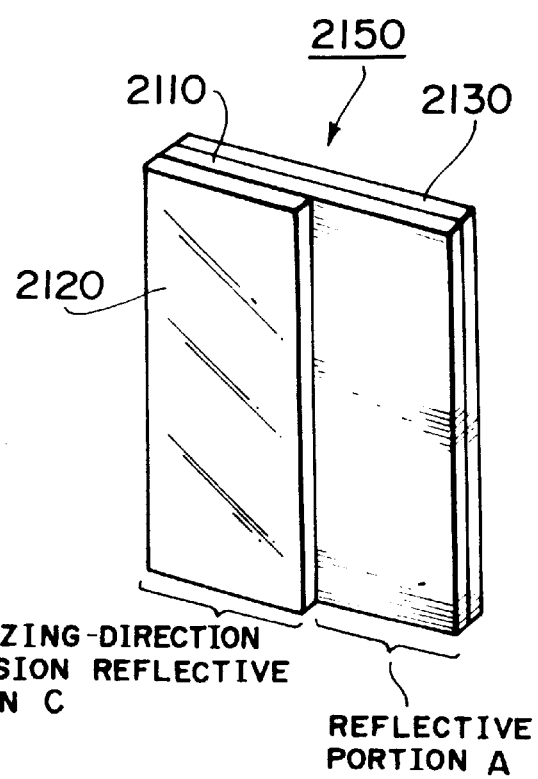
FIG. 12 is a view for describing the target shown in FIG. 10.
Figure 13:
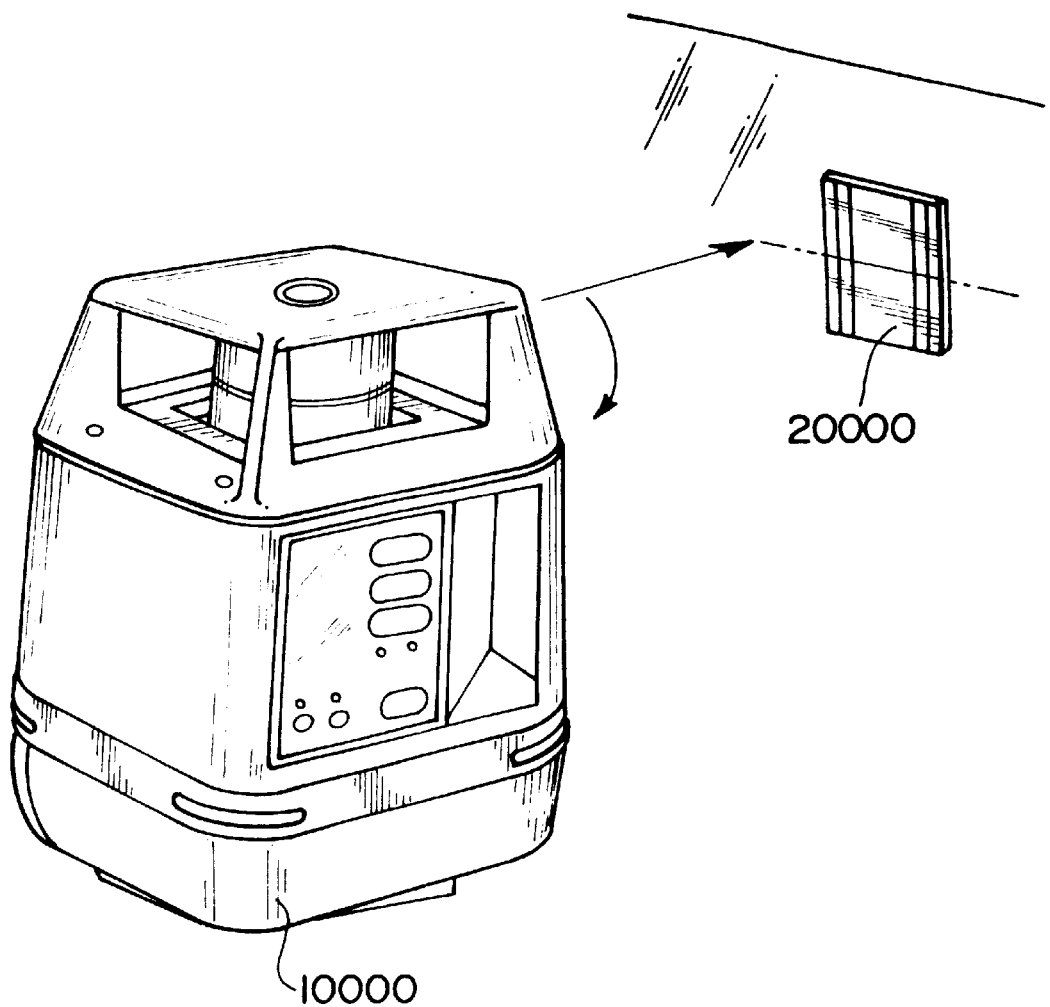
FIG. 13 is a view for explaining a prior art.
Figure 14:
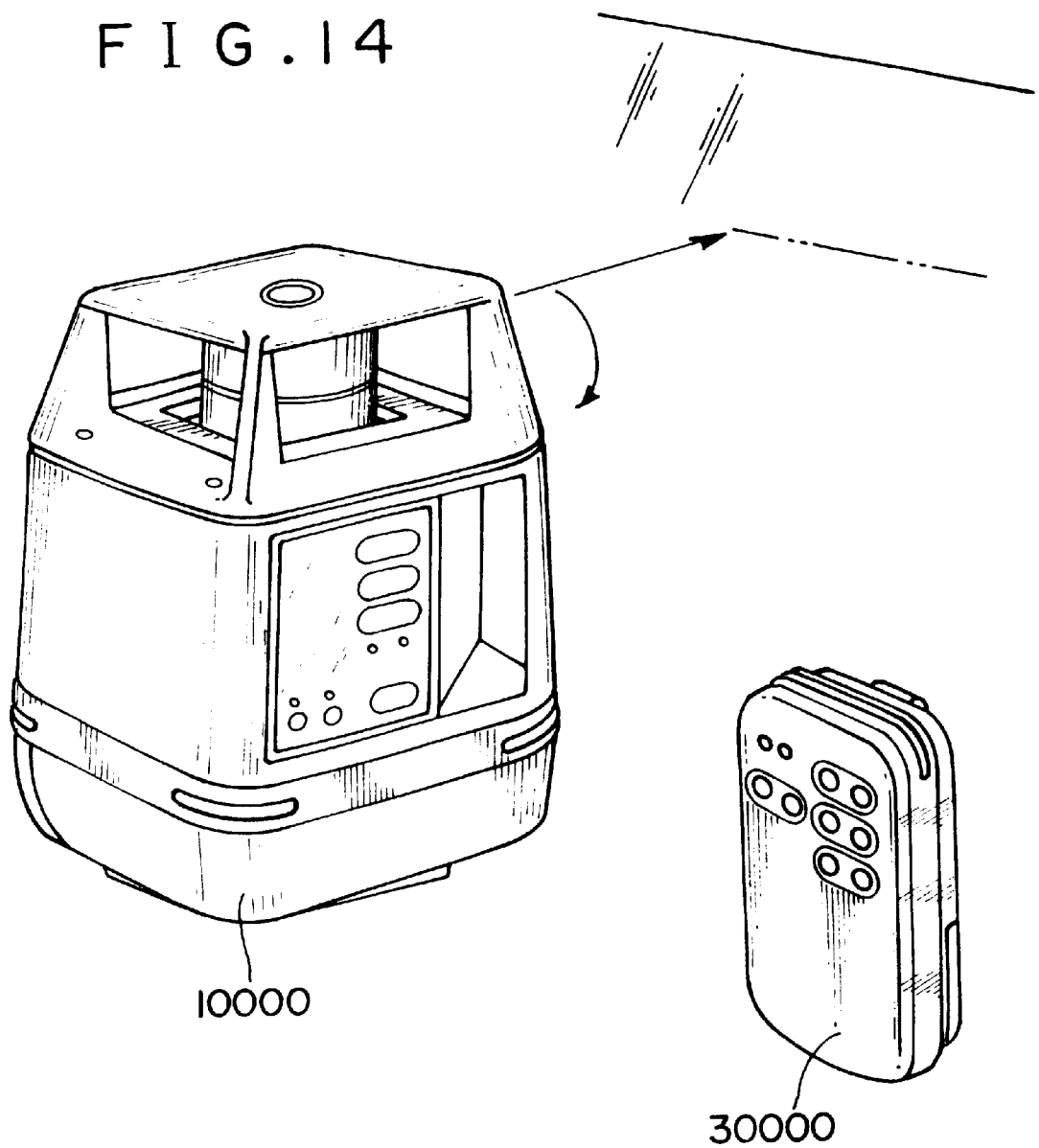
FIG. 14 is a view for explaining another prior art.

As shown in FIG. 12, a combination reflective member 2150 formed on a target 2000 is configured by stacking a retroreflective member 2110 on a substrate 2130 and bonding a λ/4 double refractive member 2120 to the left half of the retroreflective member 2110 in the drawing. The combination reflective member 2150 comprises a reflective portion A at which the retroreflective member 2110 is partly made bare and which stores the polarizing direction of an incident light flux and reflects it, and a polarizing-direction conversion reflective portion C at which the retroreflective member 2110 is covered with the λ/4 double refractive member 2120 and which is used to perform polarizing-direction conversion on the incident light flux and reflect it.

The width of the reflective portion A and that of the polarizing-direction conversion reflective portion C are kept constant. The reflective portion A is made of a member in which the retroreflective member 2110 is bare and a plurality of small corner cubes or a spherical reflector or the like is provided.

Further, the polarizing-direction conversion reflective portion C is formed by stacking the λ/4 double refractive member 2120 on the retroreflective member 2110 and has the action of causing the polarized flux of reflected light to produce a phase difference of λ/2 with respect to the incident light flux. Thus, the reflected flux of light passes through the λ/4 double refractive member 2120 twice with respect to the incident light flux. When the circularly polarized light enters, the reflected light becomes reversely-rotated circularly polarized light. On the other hand, when the linearly polarized light enters, the reflected light has a plane of polarization normal to the incident light.

A method of detecting the target 2000 will next be described.

A polarized flux of reflected light emitted from the laser diode 125 driven by the light-emitting device drive unit 119 is modulated based on a clock signal outputted from an oscillator 142. The linearly polarized flux of irradiation light emitted from the laser diode 125 is brought to a parallel light flux by the collimator lens 126. Further, the light flux passes through the λ/4 double refractive member 127 and is deflected 90 degrees by the pentaprism 114, after which it is emitted from the rotatable irradiating device body 1.

The pentaprism 114 is turned under the rotation of a drive gear 16 and a driven gear 17 by a scan motor 15. The pentaprism 114 is first rotated all around. Accordingly, the polarized flux of irradiation light emitted from the pentaprism 114 performs all-around scan.

As described above, the target 2000 comprises the reflective portion A and the polarizing direction conversion reflective portion C. The polarized flux of light reflected from the reflective portion A is circularly polarized light whose polarized state of incident polarized flux of irradiation light has been stored, whereas the polarized flux of reflected light reflected from the polarizing-direction conversion reflective portion C is circularly polarized light λ/2 out of phase with the polarized state of the incident polarized flux of irradiation light.

The polarized flux of light reflected by the target 2000 is deflected 90 degrees by the pentaprism 114, followed by falling on the perforated mirror 128. The perforated mirror 128 reflects the reflected flux of light on the condenser lens 130. The condenser lens 130 causes the reflected flux of light to enter into the second λ/4 double refractive member 131 as focused light. The polarized flux of reflected light returned as the circularly polarized light is converted into linearly polarized light by the second λ/4 double refractive member 131, followed by entering into the pinhole 132. Since the corresponding polarized flux of reflected light is λ/2 out of phase with the polarized flux of light reflected by the reflective portion A as described above, the two polarized fluxes of reflected light each converted into the linearly polarized light by the second λ/4 double refractive member 131 are different in plane of polarization by 90 degrees from each other.

The pinhole 132 has the function of avoiding the launching of an unwanted flux of reflected light whose optical axis is shifted from the polarized flux of irradiation light emitted from the body, i.e., a light flux reflected from an unnecessary or undesired reflector other than the target 2000 into the first photoelectric converters 134 and 135. The polarized flux of reflected light transmitted through the pinhole 132 is launched into the polarizing beam splitter 133.

The polarizing beam splitter 133 has the function of dividing the light flux into intersecting polarized components. The first photoelectric converters 134 and 135 for respectively transmitting a polarized flux of reflected, light (which is different in polarizing direction by 180 degrees from the polarized flux of irradiation light emitted from the laser diode 125) similar to the polarized flux of irradiation light emitted therefrom and reflecting a polarized flux of reflected light different in polarizing direction by 90 degrees from the polarized flux of reflected light emitted from the laser diode 125 receive the divided polarized fluxes of reflected light respectively.

The states of light reception by the first and second photoelectric converters 134 and 135 will be described below. Namely, when the polarized flux of light reflected by the polarizing-direction conversion reflective portion of the target 2000 falls on the reflected light detecting unit 117, the quantity of light launched into the first photoelectric converter 134 becomes greater than the quantity of light launched into the second photoelectric converter 135 from the relationship between the second λ/4 double refractive member 131 and the polarizing beam splitter 133. On the other hand, when the polarized flux of light reflected by the reflector or the undesired reflector of the target 2000 falls on the reflected light detecting unit 117, the quantity of light launched into the second photoelectric converter 135 becomes greater than the quantity of light launched into the first photoelectric converter 134.

Thus, whether the incident polarized flux of reflected light has been reflected from the reflective portion A of the target 2000 or from the polarizing-direction conversion reflective portion C, can be identified by making the difference between the polarized bundles of reflected light launched into the first photoelectric converters 134 and 135.

As the target 2000 having the above-described construction is illustrated, two signals whose positive and negative reversals take place, which have been divided definitely by the irreflective portion, are obtained as signals outputted from a differential amplifier 141 at the time that a laser beam is scanned. Detecting the signals at the time of the positive and negative reversals allows the removal of the fuzziness of a rise in signal. Further, since the difference $t_3$ in time between the two positive and negative reversal signals is peculiar to the target 2000, it is possible to accurately recognize the target 2000 by detection of the time difference $t_3$. Even if light reflected from laminated glass or the like exists, no malfunction occurs.

Figure 2:
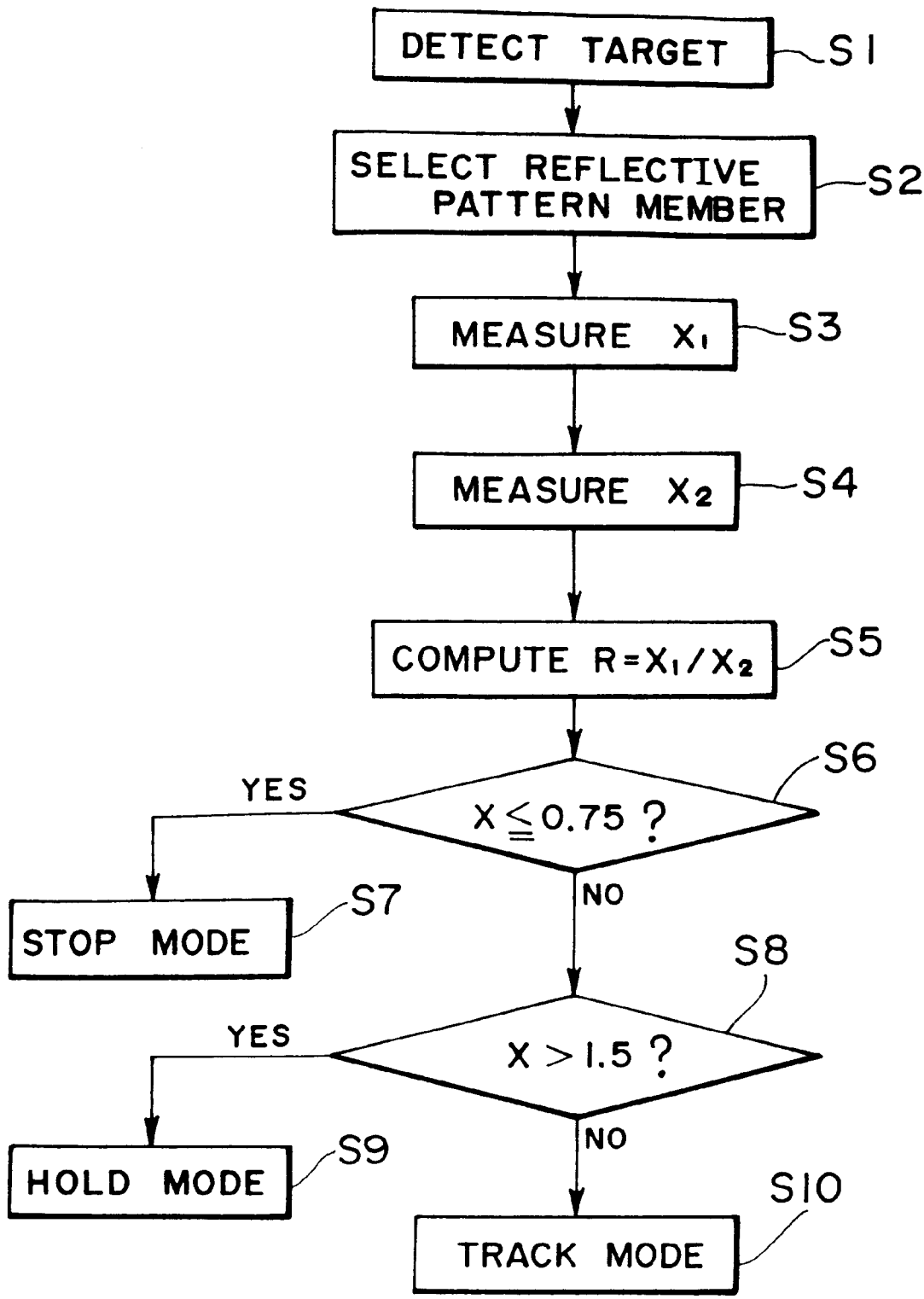
FIG. 2 is view for describing the operation of the present embodiment.

The operation of the present embodiment will next be described with reference to FIG. 2.

The operation thereof will be described by an example to which the above-described fifth principle is applied.

In the present embodiment, as shown in FIG. 9, an [operation command] is identified based on the length ratio of a distance ($X_1$) between a combination reflective member 2150 on the left end side and a combination reflective member 2151 for identification to a distance ($X_2$) from the combination reflective member 2151 for identification to the combination reflective member 2150 on the right end side.

Now consider where $R=X_1/X_2$.

A condition for $R \leq 0.75$ is defined as a [stop mode]. A condition for $R \geq 1.5$ is defined as a [hold mode]. A condition for $0.75<R<1.5$ is defined as a [track mode].

In Step 1 (hereinafter abbreviated as "S1"), the laser irradiating device body 1000 first scans the target 2000 to detect it. Next, a userselects a reflective pattern member 2100 corresponding to the [operation command] for the laser irradiating device body 1000 in S2. Namely, the handle 2900 is shifted in the upward and downward directions or the knob 2950 is rotated to make the reflective pattern member 2100 bare through the window 2800 of the target 2000 shown in FIG. 10 or 11, whereby the reflective pattern member 2100 corresponding to the [operation command] is displayed out or bared.

Next, in S3, the calculate processing means computes the distance ($X_1$) from the combination reflective member 2150 on the left end side to the combination reflective member 2151 for identification, using the scan time and detecting time of the laser irradiating device body 1000.

In S4, the calculate processing means calculates the distance ($X_2$) from the combination reflective member 2151 for identification to the combination reflective member 2150 on the right end side.

Further, the calculate processing means computes $R=X_1/X_2$ in S5.

Next, the arithmetic processing means determines in S6 whether $R \leq 0.75$. If $R \leq 0.75$, then, the calculate processing means proceeds to S7, where the condition for $R \leq 0.75$ is determined as a [stop mode]. Thus, the arithmetic processing means stops the laser irradiating device body 1000.

If the answer is found to be NO in S6, then the calculate processing means proceeds to S8, where a decision as to whether $R \geq 1.5$ is made. If it is determined in S8 that $R \geq 1.5$, then the arithmetic processing means proceeds to S9, where the arithmetic processing means sets the laser irradiating device body 1000 to a ∉hold mode].

If the answer is found to be NO in S8, then the arithmetic processing means proceeds to S10, where the arithmetic processing means sets the laser irradiating device body 1000 as a [track mode].

The present invention constructed as described above is a target device for reflecting a laser beam produced from a laser irradiating device. A reflective pattern member in which a reflective portion A and an irreflective portion B are arranged, is prepared in plural form. The reflective portions A and the irreflective portions B of the individual reflective pattern members are respectively made different in arrangement from each other. A reflective pattern member corresponding to a command to be transferred to the laser irradiating device is configured so as to reflect identification reflected light corresponding to the command on the laser irradiating device. Therefore, an advantageous effect can be brought about in that the laser irradiating device can be remote-controlled without using a radio remote controller and can provide economy.

Further, according to the present invention, a reflective pattern member in which a reflective portion A for storing the direction of polarization and reflecting it, an irreflective portion B and a polarizing-direction conversion reflective portion C for converting the direction of polarization and reflecting it are arranged, is prepared in plural form. The reflective portions A and the irreflective portions B of the individual reflective pattern members are respectively made different in arrangement from one another. Further, a reflective pattern member corresponding to a command to be transferred to the laser irradiating device reflects identification reflected light corresponding to the command on the laser irradiating device. Therefore, an excellent effect can be brought about in that the command can be reliably identified and less malfunction is provided.

While the present invention has been described with reference to the illustrative embodiment, this description is not intended to be construed in a limiting sense. Various modifications of the illustrative embodiment will be apparent to those skilled in the art on reference to this description. It is therefore contemplated that the appended claims will cover any such modifications or embodiment as fall within the true scope of the invention.

What is claimed is:

1. A target device for a laser remote command system, for reflecting a laser beam produced from a laser irradiating device, comprising:

a reflective pattern formed from at least four reflective pattern members including reflective portions A and irreflective portions B, said reflective portions A of said each reflective pattern member being different in arrangement from said irreflective portions B thereof, said reflective pattern corresponding to one of a plurality of commands to be transferred to said laser irradiating device.

2. A target device for a laser remote command system for reflecting a laser beam produced from a laser irradiating device, comprising:

a plurality of reflective patterns formed from a plurality of pattern members including reflective portions A for maintaining the direction of polarization and reflecting it, irreflective portions B and polarizing-direction conversion reflective portions C for converting the direction of polarization and reflecting it, said reflective portions A of said reflective pattern being different in arrangement from said irreflective portions B thereof, said reflective pattern corresponding to one of a plurality of commands to be transferred to said laser irradiating device and reflecting identification reflected light corresponding to the command onto said laser irradiating device.

3. A target device for a laser remote command system, for reflecting a laser beam produced from a laser irradiating device, comprising:

a plurality of reflective pattern members including combination reflective members respectively composed of reflective portions A for maintaining the direction of polarization and reflecting it, and polarizing-direction conversion reflective portions C for converting the direction of polarization and reflecting it are arranged, said combination reflective members of said individual reflective pattern members being respectively different in arrangement from one another, each of said reflective pattern members corresponding to one of a plurality of commands to be transferred to said laser irradiating device.

4. A target device as claimed in claims 1, 2 or 3, wherein said plurality of reflective pattern members are arranged in a unique arrangement for each of said plurality of commands.

5. A laser remote command system comprising:

a laser body, the laser body including a laser irradiating source, a laser receiver, and a controller operatively coupled to said laser receiver;

a plurality of target devices, said target devices having one of a plurality of patterns corresponding to one of a plurality of commands, one of said commands being transferred to said controller when a signal from said laser irradiating source is incident on a selected one of said plurality of targets and at least a portion of the signal is reflected to said laser receiver in accordance with said pattern.

6. The laser remote command system of claim 5, wherein said patterns include a plurality of reflective portions and a plurality of non-reflective portions arranged to correspond to one of said plurality of commands.

7. The laser remote command system of claim 5, wherein said patterns include a plurality of reflective portions, a plurality irreflective portions and at least one polarization-direction conversion portion arranged to correspond to one of said plurality of commands.

8. The laser remote command system of claims 6 or 7, wherein a number of reflective portions correspond to one of said plurality of commands.

9. The laser remote command system of claims 6 or 7, wherein a spacing of said plurality of reflective portions correspond to one of said plurality of commands.

10. The laser remote command system of claims 6 or 7, wherein a width of said plurality of reflective portions correspond to one of said plurality of commands.

11. The laser remote command system of claims 6 or 7, wherein said target device includes at least one window portion, and within said at least one window portion at least one of said patterns is presented.

* * * * *